United States Patent [19]

Beukara

[11] Patent Number: 4,868,774

[45] Date of Patent: Sep. 19, 1989

[54] DIGITAL WAVEFORM GENERATOR AND ASSOCIATED METHOD

[75] Inventor: Ferial Beukara, Bagneux, France

[73] Assignee: Enertec, France

[21] Appl. No.: 291,199

[22] Filed: Dec. 28, 1988

Related U.S. Application Data

[63] Continuation of Ser. No. 840,800, Mar. 18, 1986, abandoned.

[30] Foreign Application Priority Data

Mar. 22, 1985 [FR] France ................. 85 04252

[51] Int. Cl.$^4$ ............................................. H03M 1/86
[52] U.S. Cl. ................................................. 364/724.01
[58] Field of Search ...................... 364/724.1, 721, 572; 328/14

[56] References Cited

U.S. PATENT DOCUMENTS

| | | | |
|---|---|---|---|
| 3,997,773 | 12/1976 | Van Essen et al. | 364/724 X |
| 4,296,407 | 10/1981 | Minakuchi | 328/14 X |
| 4,349,887 | 9/1982 | Crowley | 364/721 X |
| 4,472,785 | 9/1984 | Kasuga | 364/718 |
| 4,691,293 | 9/1987 | Conboy | 364/724 |

FOREIGN PATENT DOCUMENTS 2153149  5/1973  France .

1153839  5/1969  United Kingdom .

OTHER PUBLICATIONS

White, "A Slow Approach to Mechanizing a Fast Digital Interpolation Filter", IEEE Trans. on Audio and Electroacoustics, vol. AU-20, No. 1, Mar. 1972, pp. 90-93.

Hirosaki et al., "*A CMOS-VLSI Rate Conversion Digital Filter for Digital Audio Signal Processing*", ICASSP84, Proc. of IEEE International Conference on Acoustics, Speech, and Signal Processing, San Diego, CA, USA, Mar. 19-21, 1984, pp. 44.4.1-44.4.4.

*Primary Examiner*—Gary V. Harkcom
*Assistant Examiner*—Tan V. Mai
*Attorney, Agent, or Firm*—Dale V. Gaudier

[57] ABSTRACT

The present invention relates to synthesis of an analog waveform representative of digital input words but subject to band limiting. In a device for performing such a synthesis a plurality of samples, obtained from the input words by accessing them in memory at a sampling frequency are filtered by a programmable digital filter to yield a plurality of output words which may be fed to a digital to analog converter at a conversion frequency, the converter producing an analog output representative of the input words.

14 Claims, 2 Drawing Sheets

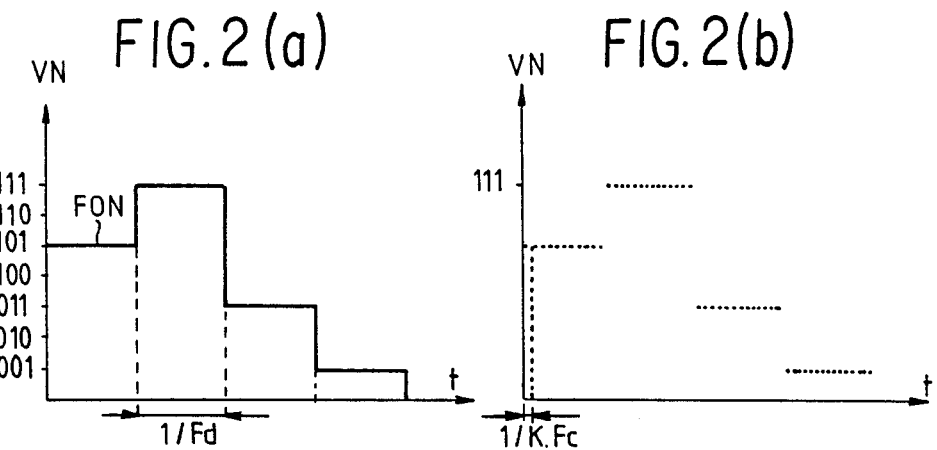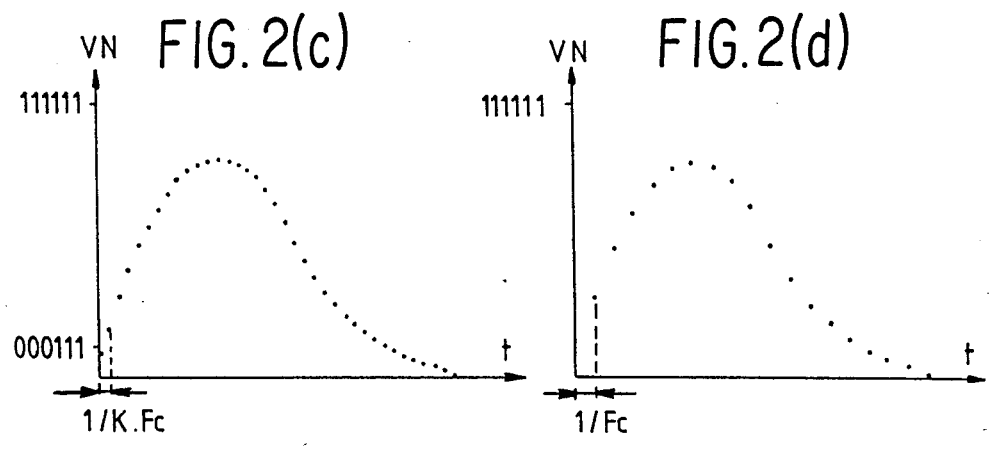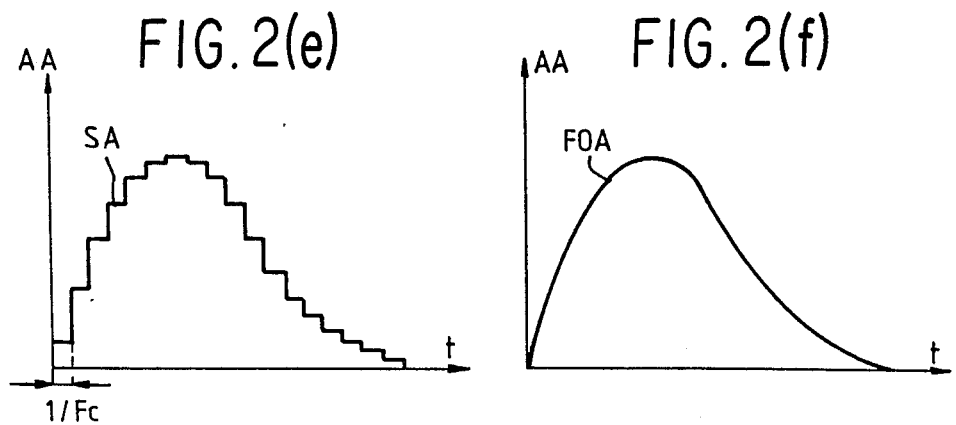

DIGITAL WAVEFORM GENERATOR AND ASSOCIATED METHOD

This application is a continuation of application Ser. No. 840,800, filed March 18, 1986, now abandoned.

BACKGROUND OF THE INVENTION

1. Field of the Invention

The present invention concerns a method and a device for producing, from a series of N digital values representing the successive steps of a virtual digital waveform, and in a frequency band limited by a maximum frequency $F_M$, a real analog waveform of which the variation of amplitude with time corresponds at least approximately to that which the virtual waveform, stepping at a given stepping frequency $F_d$, would have.

Devices of this type are known in the domain of television broadcasting, and are used notably for the emission of auxiliary signals, such as signals for broadcasting data.

It is known in fact that television is used in many countries not only for transmitting audio-visual information corresponding to its prime function, but also digital information of collective interest; in France for example, the method known under the name "ANTIOPE" permits the broadcasting of digital data, such as stock market prices, accessible to any suitable information terminal connected to a television receiver.

In the case of broadcast data signals, the signals physically transmitted are analog waveforms intended to represent successive binary digital values, that is to say each consisting of a 0 bit or 1 bit.

It can thus be considered, in a slightly arbitrary but convenient manner, that the message to be transmitted, formed of N binary digital values, constitutes a virtual digital waveform which is, at its transmission, brought into existence as a real analog waveform.

While the first is defined only by the prescribed digital values, the second is defined by a group of physical parameters.

In particular, in the case of the generation of such broadcast data signals for television, the transmitter is conditioned by two parameters, which are on the one hand the stepping frequency $F_d$ of the virtual digital waveform to which the signal physically transmitted (that is to say the analog waveform) must correspond, and on the other hand by the maximum frequency $F_M$ present in the transmitted signal, that is to say the highest frequency of significant amplitude of the spectrum of the analog waveform.

2. Decription of Related Art

Traditionally, generators of broadcast data signals comprise means for re-reading, at a stepping frequency (which can be called a bit frequency) determined by an oscillator, and in the form of electrical signals of high level (for 1 bits) or low level (for 0 bits), the binary digital values of the broadcast data, and an analog low-pass filter for receiving these signals and producing an analog waveform of which the maximum frequency is limited to a value $F_M$ determined by the cut-off frequency of the filter.

However, although limited to a predetermined frequency band, the analog waveform transmitted must be recognised, at the receiver, as carrying the digital information constituted by the binary values which have served to form it.

For that, it is necessary, according to Shannon's theorem, that the maximum frequency $F_M$ of the analog waveform must be at least equal to twice the stepping frequency (or bit frequency) $F_d$ of the digital binary values.

As a result, in the known generators of broadcast data signals, in which the maximum frequency is determined once and for all by the physical characteristics of the analog output filter, the stepping frequency cannot be modified as desired, not only because it is itself physically determined by an oscillator, but also because the maximum frequency to which it is related cannot be changed without physical modification of the analog output filter.

These limitations constitute an obstacle to the necessity of being able to adapt to new norms and requirements and to transmit broadcast data signals of adjustable stepping frequencies.

It is known on the other hand that television broadcasting uses as auxiliary signals, in addition to broadcast digital data signals, test signals (or "test lines") intended for measuring the quality of the television transmission.

In fact, because of the worldwide dimension taken on at present by television transmission, international norms have been established for the control of the quality of transmissions.

This control is effected by transmitting, in addition to the audio-visual information intended for the public, predetermined test signals defined by norms and transmitted in a predetermined frequency band.

The observation, effected at the level of centralised television receivers, of the distortion suffered by the test signals received, permits an appreciation of the quality of the transmission.

At the present time, these test signals, of an analog nature, are produced by specific generators, different from the generators of broadcast data signals, which leads to the necessity of using a considerable amount of equipment for the generation of auxiliary television signals.

In this context, the object of the invention is to propose, for applications furthermore not limited to the emission of television test signals, means permitting the synthesizing, from digital values of a virtual waveform used at a stepping frequency $F_d$, an analog waveform having a maximum frequency $F_M$, while choosing the stepping frequency and the maximum frequency of this analog wave.

3. Summary of the Invention

To this end, the method of the invention, which when applied to television permits the synthesis of broadcast data signals as well as test signals, is characterised in that it comprises:

a preliminary sampling operation comprising producing digital input samples representative of the amplitude of a digital waveform in a number at least equal to the product M of the number N of digital values and the quotient of a predetermined conversion frequency $F_c$ and said stepping frequency $F_d$, this quotient being greater than 1;

a digital filtering operation performed on these samples as a function of said choice of frequencies, and leading at least to the production of filtered digital words equal in number to said minimum number M, representing at least approximately, in at least two bits each, the amplitude of the analog waveform as a function of time; and a conversion operation in which these digital words are, at said conversion frequency $F_c$, converted into an signal forming at least approximately said analogue waveform, this conversion frequency $F_c$ being sufficiently high to be always at least equal to double said chosen maximum frequency $F_M$.

Preferably, the filtered digital words contain a number of bits greater than the number of bits of the initial digital values.

In the case where said digital values are binary values, the conversion frequency $F_c$ is sufficiently high to be always at least equal to four times the chosen stepping frequency $F_d$.

The filtering operation comprises generally a low-pass filtering, but can also comprise the application, to the digital samples, of a distortion necessary to compensate at least partially for the distortions introduced in the processing of the digital words by the conversion operation.

Advantageously, the number of digital samples produced before the filtering is greater than the number of digital words converted in the course of the conversion operation. More particularly, it can be envisaged that the number of digital samples should be a relatively high multiple of the number of digital words, for example equal to 8 times the number of digital words.

As the number of digital words is greater than the number of initial digital values, the number of samples is itself very much greater to this number of values.

This characteristic is important for the following reason: the analog waveform produced must not only have a chosen maximum frequency, but also represent as well as possible the initial virtual digital waveform. At the level of the digital filter, the shape of the virtual waveform is known only by the intermediary of the samples which are supplied to this filter. However, it is known that the shape of a sampled waveform is increasingly well known as the number of samples is increased. Thus, the waveform of which the shape corresponds to the digital words produced by the filter can better take account of the initial virtual digital waveform as the number of samples used for the filtering is increased.

The method of the invention can include an operation of storing the digital values and/or the samples in a memory, prior to the digital filtering operation and permitting this filtering to be carried out at a later time, the operation of storing the samples in a memory then replacing the operation of sampling in the manner described earlier.

Similarly, the method of the invention can include an operation of storing in memory filtered digital words, after the filtering operation and permitting the reproduction many times of the analog waveform from these words, while having performed said filtering only once.

Preferably, the method of the invention also comprises an operation of smoothing the analog signal resulting from the conversion, permitting the obtaining, from said analog signal, of said definitive analog waveform.

The device of the invention, intended to produce, from a series of N digital values representing successive steps of a virtual digital waveform, a real analog waveform of which the variation of amplitude with time corresponds at least approximately to that which the virtual waveform, stepping at a given stepping frequency $F_d$, would have, is essentially characterised in that it comprises: sampling means for producing, at a sampling frequency $K:F_c$ greater than said stepping frequency, the digital samples representing in a supernumerary manner said digital values; a programmable digital filter adapted to receive these samples and to produce, at a frequency at least equal to a predetermined conversion frequency, digital words of at least two bits representing the variation of amplitude with time of the analog waveform, rendered capable of being synthesized in a frequency band limited by a maximum frequency $F_M$ at least equal to half said conversion frequency; and a digital-to-analog converter adapted to receive at least some of these digital words and to convert them at said predetermined conversion frequency into an analog signal forming at least approximately said analog waveform.

When the digital values to be transmitted are chosen in advance, the device preferably comprises a memory containing these values and programmable means for reading out these digital values at a chosen value of the stepping frequency $F_d$.

To obtain a reproduction as faithful as possible of these digital values, the device preferably comprises sampling means which, for the reasons set out above, operates at a sampling frequency $K:F_c$ greater than the conversion frequency $F_c$.

In the case where the digital filter produces at its output as many words as it receives input samples, that is to say in the case where it produces digital words at the sampling frequency, the device of the invention advantageously comprises at the output of the filter a buffer circuit supplying to the digital-to-analog converter, at the conversion frequency, digital words chosen in a regular manner from among the words produced by the filter.

Preferably, the digital-to-analog converter has a resolution, expressed in number of bits, higher than the number of bits of said digital values.

In a variant, the device of the invention can comprise a computer and a digital-to-analog converter, possibly followed by an analog smoothing filter.

To facilitate the implementation of the method of the invention, one can provide for a memory capable of receiving and storing the filtered digital words produced, for example at a later time, by the computer, and capable of reproducing them, at the real conversion frequency previously mentioned, to control the output digital-to-analog converter.

In this case, the computer can, instead of being used in real time, be used only for simulating, without time constraint for itself, the operation which a device of the kind described earlier would have when operating a sampling at the real frequency $K:F_c$ and a digital filtration in real time of the initial digital waveform; in this latter case, the digital words can be produced without the internal clock frequency of the computer playing a part in the implementation of the method of the invention; in particular, the use of a computer calculating the digital output words at a later time permits, with a computer of moderate performance, the calculation and storage in a memory of the digital words representing the amplitude of a waveform intended to be reproduced at a very high conversion frequency $F_c$, this reproduction consisting essentially of supplying to the output digital-to-analog converter words read out of the memory at the conversion frequency $F_c$.

BRIEF DESCRIPTION OF THE DRAWINGS

A particular way of implementing the invention will be described hereinafter, by way of non-limitative example only, with reference to the drawings, in which:

FIG. 2a to 2f are diagrams representing the waveforms or signals appearing at different points in the device of FIG. 1; in these diagrams, the abscissa represents the variable, time t, the ordinate VN represents a digital value and the ordinate AA represents the amplitude of an analog signal.

DESCRIPTION OF A PREFERRED EMBODIMENT

Figure 1:
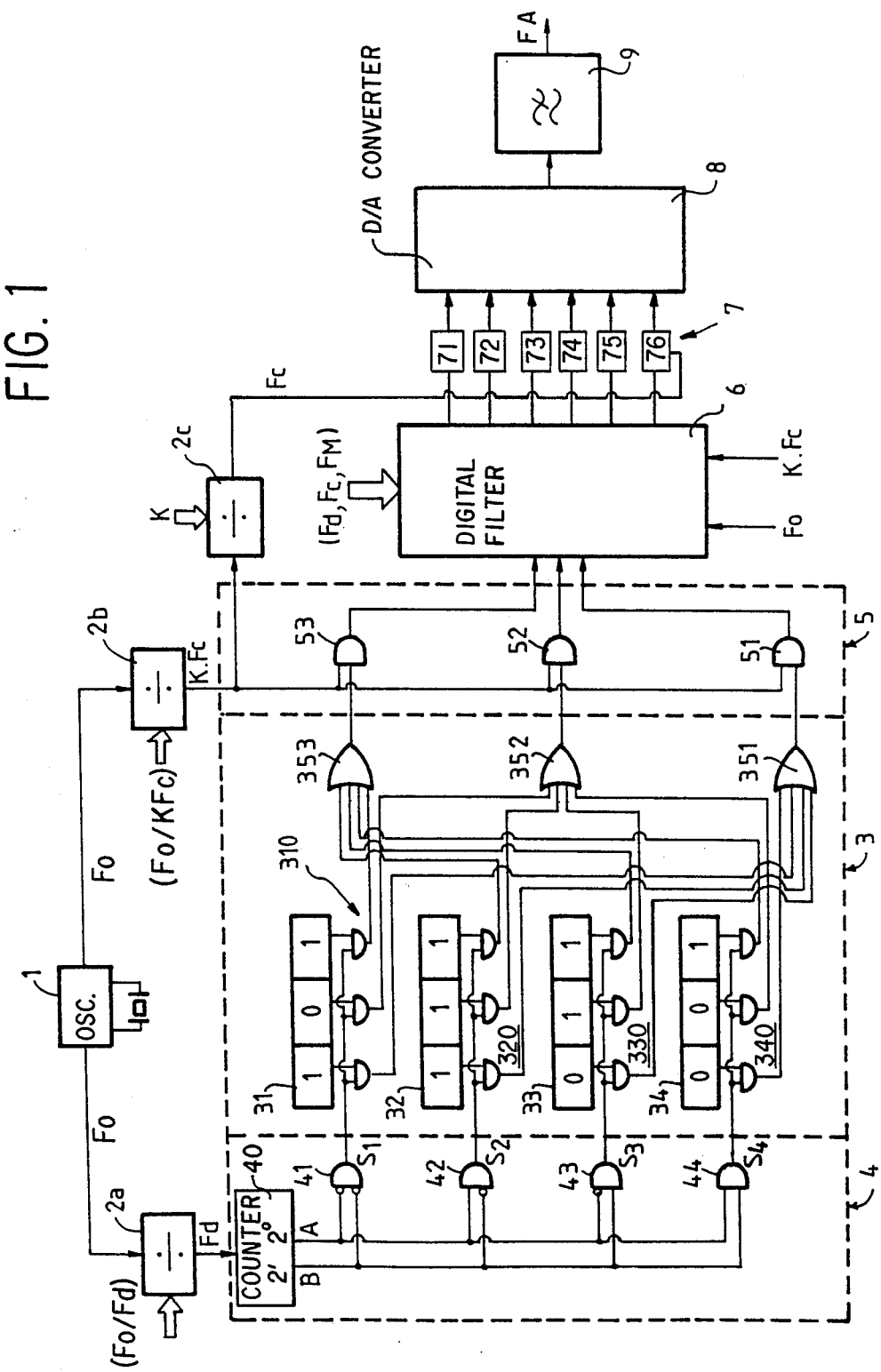
FIG. 1 is a block diagram of a device according to the invention.

The device of the invention, as represented in FIG. 1, will be assumed to operate in real time. The device comprises first of all circuits allowing the definition of at least one stepping frequency $F_d$, a sampling frequency $K:F_c$ and a conversion frequency $F_c$, the parameter K representing a multiplying factor between these two latter frequencies.

To this end, the device comprises for example a quartz oscillator 1 producing a principal clock signal of very high frequency $F_o$, and three frequency dividers 2a, 2b, 2c receiving, directly or indirectly, the clock signal $F_o$ and producing the signals of frequency $F_d$, $K:F_c$ and $F_c$. Among these frequency dividers 2a to 2c, at least the first, 2a, which supplies the stepping frequency $F_d$, is a programmable divider, by means of which this frequency can be selected.

A memory 3, for example of the ROM type, contains N digital values from which the analogue waveform must be synthesized. For the sake of simplification, the device of the invention will be described with a relatively low number (N=4) of digital values, it being well understood that this number can be as great as necessary.

These digital values can a priori be binary (that is to say of 1 bit) or of several bits. In the event, in the diagram of FIG. 1, each of the four values has three bits and is contained in a corresponding register 31 to 34.

An address counter 4 is provided at the input of the memory 3 for sequentially accessing each of these four values.

This address counter 4 comprises for example a counter 40 having two outputs for binary signals A and B, and receiving the stepping frequency $F_d$. These outputs are connected to logic gates 41 to 44 respectively producing the combined signals $S_1$=NOT A AND NOT B, $S_2$=A AND NOT B, $S_3$=NOT A AND B, $S_4$=A AND B.

The signals $S_1$ to $S_4$, which each in turn are at a high logic level during a time interval $1/F_d$, are applied to pro-inputs of AND gates disposed in respective groups 310, 320, 330, 340 and associated with the respective registers 31 to 34. The other input of each of these AND gates receives a bit corresponding to the value contained in the register with which this gate is associated. Finally, the outputs of the gates receiving the $n^{th}$ bit of each digital value (n=1 to 3 in the event) are connected to a respective $n^{th}$ OR gate 351, 352, 353.

As a result of this arrangement, the OR gates 351 to 353 supply in parallel the three bits of one of the digital values (101, 111, 011, 001) stored in the memory 3, and these values step at the frequency $F_d$ chosen by adjustment of the divider 2a.

The state of the outputs of the OR gates 351 to 353 in the course of time defines ideally, that is to say if the transition times between the different values are considered infinitely short, the virtual digital waveform FON represented in FIG. 3a and consisting of values coded in three bits.

If the digital waveform to be reproduced were composed of binary values, and for example the most significant bits of the values 101, 111, 011 and 001, the two rightmost cells of each register 31 to 34 and the OR gates 352 and 353 would be omitted.

The device furthermore comprises a sampling ciruit 5 represented in the form of a group of three AND gates 51 to 53 receiving on the one hand the output signals of the respective OR gates 351 to 353 and on the other hand the clock signal at the sampling frequency $K:F_c$.

This sampling circuit 5 produces at its output, constituted by the parallel outputs of the AND gates 51 to 53, input digital samples such as are represented in FIG. 2b.

These samples, representative of the virtual digital waveform FON, are produced at the sampling frequency $K:F_c$ such that their number, for N digital values (N=4 in the example chosen) is equal to $N:K:F_c/F_d$.

The multiplying factor K is chosen at least equal to 1, that is to say the minimum number of samples is equal to $N:F_c/F_d$; furthermore the ratio $F_c/F_d$ is chosen to be greater than 1, such that the number M of samples is greater than the number N of initial values.

Additionally, it is advantageous to give K an integral value substantially greater than 1, for example 8; the sampling frequency is then equal to eight times the conversion frequency. In fact, a better reproduction of the virtual waveform by the analogue waveform is thus obtained, thanks to the fact that the digital filter has more information on the virtual waveform as the sampling frequency is increased.

These samples (FIG. 2b) are, at the frequency $K:F_c$, applied to the input of a programmable digital filter 6. This filter, of a type known per se, receives as clock signals, the signals of frequency $F_o$ and $K:F_c$, and as programming data, parameters representative of the stepping frequency $F_d$, the conversion frequency $F_c$ and the maximum frequency $F_M$.

The clock signal $F_o$, of high frequency with respect to the frequency $K:F_c$, constitutes the principal clock signal defining, in a manner known per se, the instants at which the elementary operations of the filter must be effected, while the signal of frequency $K:F_c$ defines for the filter, in a manner also known per se, the instants at which the samples are available at the input of the filter.

If it is fixed once and for all, as will generally be the case, the conversion frequency $F_c$ can be supplied to the filter in the form of a definitive (non-adjustable) parameter.

From these signals and parameters, the filter 6 produces, in a manner known per se, digital words (FIG. 2c) encoded in a number of bits greater than the number of bits of the initial digital values and representing at least approximately the shape of the filtered analog waveform of which the frequency spectrum is limited by the maximum frequency $F_M$.

This digital filter 6 thus implements at least a low pass filtering intended to limit the frequency band of the analog waveform; the output digital words from the filter, in principle equal in number to the number of samples if the filter 6 is of a classic type, are supplied to a buffer register 7 comprising a battery of registers 71 to 76 each receiving a bit of the output word of the filter.

The access to these registers (limited to one bit each for example) is controlled by the signal of frequency $F_c$, such that the buffer register 7 delivers at its output, at the conversion frequency $F_c$ (FIG. 2d), filtered digital words of which the number M, for N initial digital values, is equal to $N \cdot F_c/F_d$.

These words are transmitted to a digital-to-analog converter 8 which produces an analog signal (FIG. 2e) near to the desired analog waveform FOA.

This latter can in fact be obtained (FIG. 2f), with spectral qualities better than those of the analog signal of FIG. 2e, by means of an analog smoothing filter 9 disposed at the output of the digital-to-analog converter 8. This smoothing filter 9 has for example a cut-off frequency equal to half the conversion frequency $F_c$.

Although the smoothing filter 9 modifies the frequency spectrum of the analog signal SA, the man skilled in the art will understand that the function of this filter is not equivalent to that of the analog band-limiting filter used in the prior art mentioned hereinabove. In fact, the smoothing filter 9 serves only to eliminate the ripple of frequency $F_c$ appearing in the spectrum of the signal SA by reason of the staircase form of this signal. However, this ripple at the frequency $F_c$ exhibits only a relatively small amplitude with respect to the other components of the spectrum of the signal SA because of the fact that the digital words are encoded in several bits. Thus, on the one hand the frequency band of the analog waveform FOA is determined almost exclusively by the operation of the programmable digital filter 6, and on the other hand, the smoothing filter 9 needs only to be adapted to the conversion frequency $F_c$, which in practice is chosen once and for all, and not to the maximum frequency $F_M$.

The buffer register 7, the digital-to-analog converter 8 and the smoothing filter 9 introduce distortions into the digital words at the output of the filter 6, which can be measured by known techniques and which manifest themselves concretely by the fact that for a given scale, the waveform of FIG. 2f does not exactly follow the shape given by the group of points of FIG. 2d. In other terms, the elements 7, 8 and 9 together have a transfer function H, which can be measured and which is responsible for these distortions. According to the present invention, these distortions can be compensated by applying to the samples, at the level of the digital filter 6, distortions corresponding to the transfer function $H^{-1}$ and which compensate the distortions introduced by the elements 7, 8 and 9.

It is also possible, according to the invention, to deliberately introduce predetermined distortions into the analog waveform. This process permits, for example, if the analog waveform is a test signal, the observation on reception of the signal in what manner the quantified distortion of the emitted test signal has been transmitted.

The described invention permits, by having initially chosen a conversion frequency $F_c$ and a maximum frequency $F_M$ at least equal to half the conversion frequency $F_c$, the ability to choose the stepping frequency $F_d$ in a certain range, without having to physically modify the device of FIG. 1. The possibility is thus obtained of applying to the analog waveform FOA a temporal transformation of which the characteristics are programmed in the device.

When the digital waveform FON is represented by binary values, the stepping frequency $F_d$ can at most be equal to half the maximum frequency $F_M$, and therefore at most equal to one quarter of the conversion frequency $F_c$.

The filtered words issuing from the buffer register 7 can be stored in a memory (not shown) so as to be capable of being used later to control a digital-to-analog converter 8 at the conversion frequency $F_c$, as the buffer register does directly in FIG. 1, this frequency $F_c$ then being able to be independent of the output frequency of the digital filter 7.

On the other hand, the device of the invention, with the exception of the converter 8 and the smoothing filter 9, can be essentially constituted by a computer. This computer can be used to implement the method of the invention either in real time as is done by the device of FIG. 1, or at a later time. In this latter case, as will be clearly apparent to a man skilled in the art, the computer is programmed to simulate the operation of the device of FIG. 1.

I claim:

1. A method for producing from a given series of digital input words, an output in the form of an analog waveform approximating, in analog amplitude with respect to time, values of a notional digital signal that would be formed by stepping through each of said digital input words at a stepping frequency selectable over a range of frequencies between a lower stepping frequency limit and an upper stepping frequency limit, said analog waveform having frequency components not exceeding a limiting frequency, comprising the steps of:

deriving a plurality of digital samples from said digital input words, said samples being equivalent to a sampling of said notional digital signal at a sampling frequency which exceeds said stepping frequency;

applying said samples to a programmable digital filter arranged to filter said samples to produce a sequence of digital output words, at a predetermined conversion frequency, said conversion frequency being at least twice said limiting frequency and independent of said selected stepping frequency; and converting said output words from digital form to analog form at said conversion frequency to thereby yield said analog waveform as said output.

2. A method according to claim 1 including the step of arranging said digital filter to provide digital output words having a number of bits greater than the number of bits of said digital input words.

3. A method according to claim 1 and including the step of selecting said conversion frequency to be at least four times said stepping frequency.

4. A method according to claim 1 including the step of arranging said digital filter as a low pass filter.

5. A method according to claim 1 and including the step of selecting the number of said digital samples to be greater than the number of digital output words converted.

6. A method according to claim 1 including, as said step of deriving samples, storing said digital input words in a memory and accessing said memory at a later time prior to sampling.

7. A method according to claim 1 including the step of storing the digital output words in a memory and accessing said stored words to repeatedly generate said analog waveform.

8. A method according to claim 1 including the step of, during said step of applying said samples to said digital filter, applying a weighing to said digital samples said weighing being selected to compensate for distortion introduced in conversion of said digital output words.

9. A method according to claim 1 and including the step of smoothing said analog waveform.

10. A device for producing, from a given series of digital input words, an output in the form of an analog waveform approximating, in analog amplitude with respect to time, values of a notional digital signal that would be formed by stepping through each of said digital input words at a stepping frequency selectable over a range of frequencies between a lower stepping frequency limit and an upper stepping frequency limit, said analog waveform having frequency components not exceeding a limiting frequency, said device comprising:

sampling means for deriving a plurality of digital samples from said digital input words, said samples being equivalent to a sampling of said notional digital signal at a sampling frequency, said sampling frequency exceeding said stepping frequency;

a programmable digital filter arranged to filter said samples to produce a sequence of digital output words, at a predetermined conversion frequency, said conversion frequency being at least twice said limiting frequency and independent of said selected stepping frequency, and a digital to analog converter for converting said output words from digital form to analog form at a said conversion frequency to thereby yield said analog waveform as said output.

11. A device according to claim 10 comprising a memory for containing said digital input words and programmable means for accessing said words at a stepping frequency.

12. A device according to claim 11 and wherein said sampling frequency is greater than said conversion frequency.

13. A device according to claim 12 wherein said digital filter produces output words at said sampling frequency and comprising a buffer circuit for supplying selected digital output words to said digital to analog converter at said conversion frequency.

14. A device according to claim 10 wherein said digital to analog converter has a resolution, expressed in number of bits, greater than the number of bits of said digital input words.

* * * * *